United States Patent Office 3,347,098
Patented Oct. 17, 1967

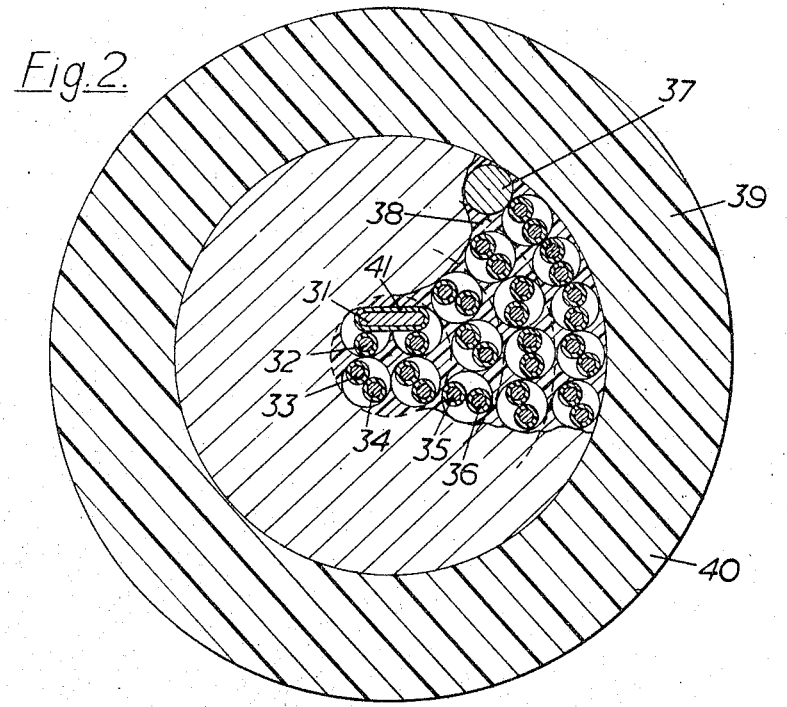
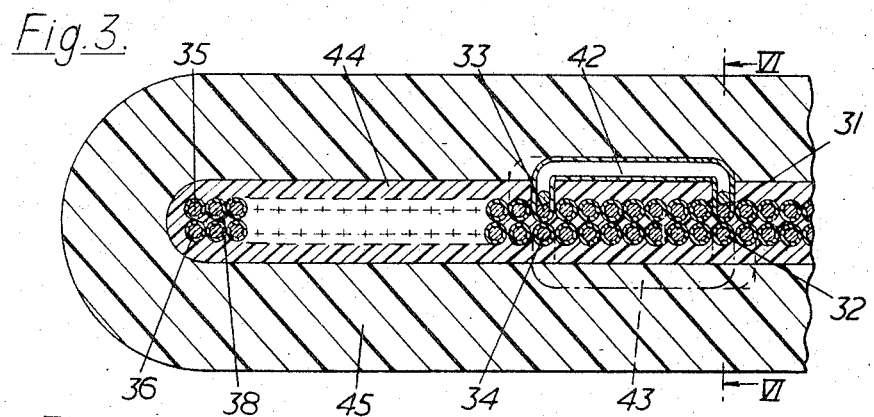

3,347,098
TEMPERATURE SENSING MEANS AND
METHOD FOR ELECTRIC CABLES
George Paul Richard Bielstein, London, and Alan Paul
Martin, East Grinstead, Sussex, England; said Bielstein
assignor to British Insulated Callender's Cables Limited,
London, England, and said Martin assignor to Telcon
Metals Limited, Crawley, Sussex, England
Filed Jan. 18, 1965, Ser. No. 426,195
Claims priority, application Great Britain, Jan. 23, 1964,
3,016/64
7 Claims. (Cl. 73—342)

ABSTRACT OF THE DISCLOSURE

The temperature variation along an electric cable is surveyed by measuring the potential drop across successive or spaced lengths of a resistance element running along the cable. The element carries a reference current and preferably has a high temperature coefficient of resistance. Tapping leads connect the ends of the lengths of the element to indicating or recording apparatus. The method is essentially potentiometric; the reference current through the whole element can be appropriately modified during the reading of each potential drop to compensate for differences in the characteristics of the lengths.

Figure 1:
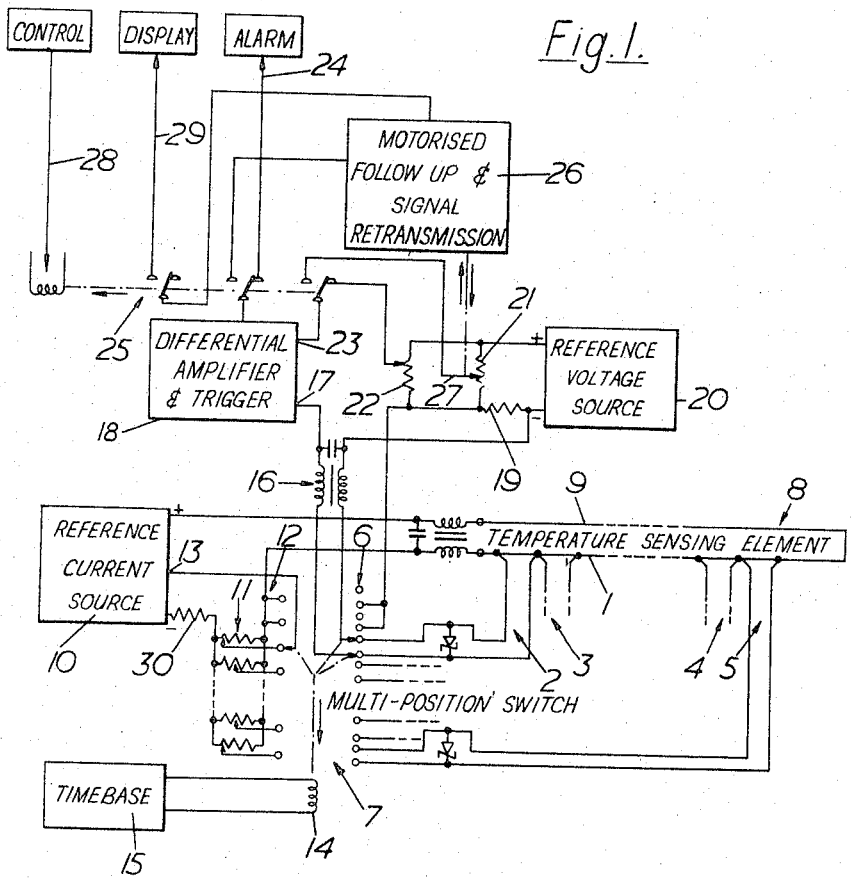

This invention relates to a method of an apparatus for surveying the longitudinal temperature distribution in an electric cable, that is the temperature distribution along the length of an electric cable, and to electric cables suitable for, and for use in, temperature surveillance by the method.

An object of the invention is to provide a method whereby the temperatures of each of a number of individual lengths of the cable can successively or simultaneously be investigated. The lengths will generally be successive lengths, although not necessarily contiguous, forming together for example the cable length lying between two joints. For convenience, the length of the cable over which the temperature distribution is to be surveyed will hereinafter be referred to as "the cable length" and the individual lengths with respect to which separate temperature indications are required will be referred to as "the elemental lengths."

In the method in accordance with the invention, an elongated resistance element, preferably a wire, is so associated with the cable throughout the cable length that its resistance is responsive to the temperatures to be surveyed, and tapping leads are connected to the elemental lengths of the resistance element and to apparatus responsive to the potential difference between the ends of each elemental length. A reference current, that is a current which, although it can in certain circumstances be adjusted, when not being adjusted will remain substantially at a predetermined constant value or at one of a number of predetermined constant values however the resistance of the element varies with temperature changes in the cable, is established in the element, whereby the potential difference between the ends of each elmental length of the element will be an indication of its temperature. The resistance element must have a temperature coefficient of resistance other than zero and preferably has a high coefficient.

An advantage of this method of temperature surveillance is that the readings are unaffected by the effective lengths of the tapping leads, which must inevitably vary conisderably along the cable length, or by varying contact resistance in switching arrangements for successively connecting different elemental lengths through a potential comparison or potential measuring device to indicating or recording apparatus.

The resistance element, a return lead therefore if required, and the tapping leads are preferably incorporated in the cable and the invention includes cables provided with such members as part of its structure, either in the form of cables whose longitudinal temperature distribution is to be surveyed or in the form of auxiliary cables for attachment to such cables.

Although when the elemental lengths of resistance element are successive contiguous lengths, a single tapping lead could serve for the contiguous ends of adjacent elemental lengths, we prefer to provide at each of such positions a pair of tapping wires interconnected only at the common point of the two elemental lengths, so that each elemental length is provided with a separate pair of tapping leads.

The apparatus in accordance with the invention preferably comprises a reference current source capable of supplying a predetermined subsantially constant current, or a series of such currents of predetermined different values, means for comparing the potential difference between the tapping leads of each pair across which an elemental length of the resistance element is connected with a preset potential, and an indicating and/or recording means responsive solely to the relationship between the preset potential and the potential difference or this potential difference modified by another factor related to the condition of the cable or its surroundings. While simultaneous measurement or comparison of the potential differences across each elemental length could be made if desired, the provision of means for successively reading the various potential differences will generally be more convenient and moreover has the advantage that compensation for structural variations in the elemental lengths of resistance wire can more readily be made, for example differences in length, and differences in resistance per unit length.

Figure 5:
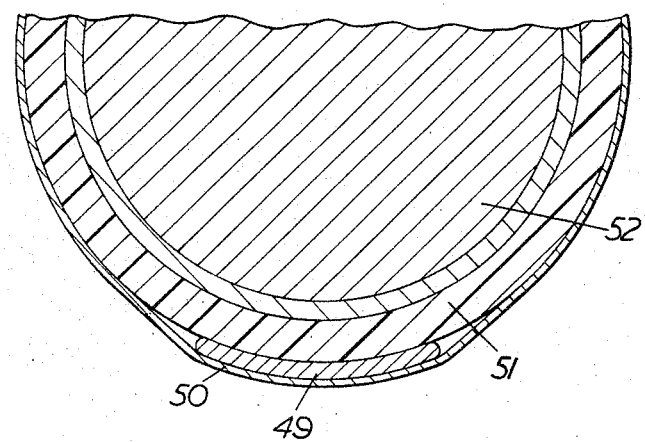
Figure 6:
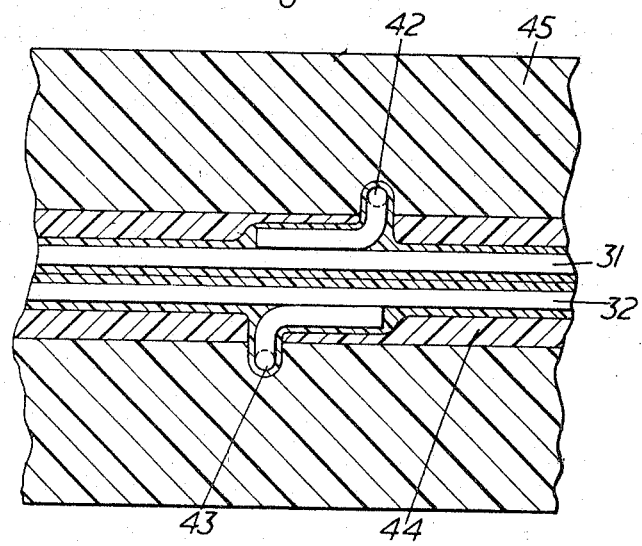

Further features of the invention and a number of embodiments thereof will now be described with reference to the accompanying drawings in which:

FIGURE 1 is a circuit diagram of a cable installation,

FIGURE 2 is a cross-sectional elevation of one form of temperature sensing cable, FIGURE 3 is a cross-sectional elevation of another form of temperature sensing cable, FIGURE 4 is a part cross-sectional elevation of a power cable incorporating the cable of FIGURE 2, FIGURE 5 is a part cross-sectional elevation of a power cable having strapped thereto the cable of FIGURE 3, and FIGURE 6 is a partial cross-section on line VI—VI in FIGURE 3.

Referring to FIGURE 1, which is a circuit diagram of apparatus for surveying the longitudinal temperature distribution along a 600 yard length of high voltage power cable, a resistance element 1 extending along the cable is provided with tapping leads attached in pairs, such as 2–5, which divide it into 48 elemental lengths. The elemental lengths can be contiguous, and hence each 12½ yards in length, or may be shorter than this, e.g., 12 yards and consequently separated by about ½ yard. The tapping leads are taken in pairs, one pair for each elemental length, to 48 pairs of contacts on one bank 6 of a 50 position rotary uniselector switch 7 located in a joint-enclosure at one end of the cable length. At the remote end 8 of the cable length the resistance element is connected to a return lead of the same material as the element. This return lead and the resistance element itself are connected to a reference current source 10, the return lead being connected directly to one terminal of the source (marked +) and the resistance element 1 being connected through 48 rheostats 11 connected in parallel to the other terminal (marked —) of the current source 10. Another bank 12 of the uniselector switch 7 successively connects the sliders of the 48 rheostats 11 to a control terminal 13 of the current source 10. Means represented by the coil 14 and time base 15 are provided for driving the uniselector switch 7 step by step at one minute intervals to move it successively through the 48 positions connected as above and the two unoccupied positions.

The output terminals of the reference current source provides a constant current through the resistance element and return lead of a value independent of the resistance of the element 1 and its return lead 9 but dependent upon which of the rheostats is connected to the control terminal and each current output is separately adjustable to enable the apparatus to be calibrated to compensate for differences between the resistance at one or more given constant temperatures of each elemental length of the resistance wire. The pickup contacts on the tapping lead bank 6 of the uniselector switch 7 are connected through a filter circuit 16 to two output leads, one of which is connected to one input terminal 17 of a differential amplifier 18 driving a trigger circuit and the other of which is connected to one terminal of a stable voltage source 20. Two potential dividers 21 and 22 are connected, in parallel, in series with a resistor 19 across the output terminals of the stable voltage source 20 and the preset tapping point of the divider 22 is connected to the other input terminal 23 of the differential amplifier 18, the arrangement being such that when the voltage derived from the elemental length of resistance element in circuit rises by a predetermined amount above the preset reference voltage derived from the source 20 and divider 22, the trigger circuit will operate to energize an alarm connected to an output 24, indicating that the temperature of an elemental length has risen above the desired value. Since the input impedance of the amplifier 18 is in series with the reference voltage generated across the preset divider 22, we prefer to use an amplifier having a high gain and as high an input impedance as possible in order to preserve as far as possible the potentiometric characteristics of the circuit. The value of the resistance 19 is so chosen in relation to that of potential dividers 21 and 22 that the range of adjustment of the dividers covers the operational range of resistance variation of the elemental lengths.

A changeover switch 25 is provided for an alternative mode of operation. When this switch is changed from the position shown on the diagram it applies the ouput of the differential amplifier 18 to a motorised followup and signal retransmission circuit 26 controlling the proportion of the output voltage of the stable voltage source 20 with which the signal is compared by adjusting a sliding contact 27 of the potential divider 21. The components of a conventional potentiometric self-balancing pen-recorder can be used for this part of the circuit.

The arrangement is such that, when the changeover switch 25 is moved by energisation of its control circuit 28 to the alternative position to that in which it is shown in the drawing, the alarm circuit is disconnected and the reference voltage is automatically adjusted by the follow-up circuit 26 to balance the voltage across the elemental length of resistance element in circuit, and a signal related to the temperature of the elemental length in circuit, is transmitted to a display or recording device through a circuit 29.

The time base circuit 15, from which the uniselector switch 7 is driven step by step, may also control the display device in such a way as to provide an indication as to the elemental length to which each measurement applies. The changeover switch 25 may also adjust the time base to reduce the intervals between the step by step movements of the switch 7.

Before use of the apparatus, the rheostats 11 are each preset, e.g., by calibration at one or more steady cable temperatures, to provide a current output from the source 10 to match the elemental length with which the rheostat is paired and produce a potential difference across the elemental length that is an accurate indication of its temperature. The potential drop from the rheostat sliders to the output terminal of the reference current source, to which the rheostats are jointly connected, is applied through the terminal 13 to a feed back circuit which regulates the current output of the current source 10 in such a way as to provide a constant current in the resistance element 1, of a value dependent upon which rheostat is in the feed back circuit. Since only small current adjustments are required, the rheostats are connected to the current source through a resistance 30 of a value such that a major part of the control voltage occurs across this resistance whereby the accuracy of adjustment is improved and temperature compensation is facilitated. The connections to the two banks 6 and 12 of multiposition switch 7 are such that the rheostats 11 are paired off with the elemental lengths.

As an alternative to the arrangement shown in the drawing, the resistance element 1 can be connected across a constant current source with a single preset output and the compensation provided in the apparatus responsive to the potential difference across the elemental lengths. For example instead of the output potentials from the elemental lengths being successively compared with a single reference voltage, a source providing a number of preset reference voltages equal to the number of elemental lengths can be used and these voltages selected by a multi-position switch coupled to the switch 7 or by the bank 12 of the switch 7. The preset voltages will similarly be paired off with the elemental lengths and can be calibrated at a constant test temperature to allow for any differences in resistance between the elemental lengths.

Both alternatives can be further modified in the following way. The signal representing the temperature of the elemental length in circuit is compared with the single preset reference voltage (as in the first example) or with the selected preset reference voltage corresponding to the elemental length (as in the second example) and then, instead of adjusting the referenc voltage to obtain a balance, the reference current is adjusted until the signal potential balances the reference potential. As in the example described with reference to the circuit diagram, this adjustment can be made by a motorised follow-up circuit which will transmit a signal representing the temperature of the elemental length in circuit.

Although it would be advantageous to arrange for the resistance element to be located in such a position in the cable that it gave a direct indication of the cable conductor temperature, for practical reasons this is generally not possible and it is usually necessary to locate the resistance element adjacent to the cable sheath or at least on the outside surface of the dielectric. We have found however that this can to some extent be compensated for by introducing into the output of the measuring device a voltage dependent upon the heat generated in the conductor by the load current in the cable. This can be derived by incorporating a simple current transformer in each joint enclosure. A correcting factor in the form of a signal related to the square of the conductor current, as measured by the current transformer, is then applied to the measuring circuit to modify the signal representing the potential drop across each elemental length. When the cable is to be operated at a varying voltage, similar compensation can be provided by deriving a further correcting factor dependent on the square of the operating voltage of the cable.

When the cable, the temperature of which is to be surveyed, is a high voltage power cable, high voltages may be induced in the resistance element and/or tapping leads. It is therefore advisable to isolate that part of the measuring apparatus connected to recording or display devices from that part connected to the resistance element. When, as in the apparatus described by way of example, a motorised follow-up and a signal retransmission circuit 26 is used, the signal retransmission device can be driven through an insulated shaft from the follow-up motor that drives the contact 27 of the potential divider 21. The control circuit 28 is isolated by its relay and the alarm circuit can be isolated by an additional relay. Conventional protective circuit elements can be connected to the tapping leads and the leads connecting the resistance wire and its return lead to the constant current source in order to protect the remainder of the measuring apparatus. The resistance element and its return lead and the pairs of tapping leads should where possible all be twisted pairs to minimise induced voltages.

The return wire and the tapping leads can be used to some extent to provide electrical screening for the resistance element and other tapping leads against over voltage generated in them by surges in the power conductor of the cable, for example by twisting together the tapping leads and/or the resistance element and its return lead.

Although reference has been made to a resistance element extending along the cable length, this element may if desired be made up from a number of lengths of wire joined end to end at the junctions between successive elemental lengths. If the tapping leads are made from the same wire as the resistance wire, each elemental length of resistance wire can be constituted by a tail end of one of the tapping leads extending beyond the tapping point to which that lead is connected and up to the next tapping point. The use of the same wire for the tapping leads as for the resistance wire has the advantage that welded connections can readily be made at the tapping points. In each pair of tapping leads the impedances of the two leads are preferably made equivalent so that the greatest possible balance is achieved.

FIGURE 2 is a cross-section of an auxiliary cable in accordance with the invention. Both the resistance element 31 and its return lead 32 are 32 S.W.G. nickel wires, of the purity used in resistance thermometers and known as "high temperature coefficient nickel." The tapping leads, such as 33, 34 and 35, 36 are wires of commercial purity nickel of the same gauge. All of the wires are coated with a conventional insulating enamel and the element 31 and return lead 32 are twinned and each pair of tapping leads is twinned.

Three pairs of twinned tapping leads and the twinned element and return lead are laid-up together to form an inner core and further twinned pairs of tapping leads are laid up around the inner core, in three further layers, to form in a known manner a 50 pair cable. In this cable the tapping leads do not extend over the full length of the cable, but the cable is built up to a uniform diameter throughout by filling pieces, such as 37, of a diameter equal to the twinned pairs. The filling pieces 37 are preferably of non-hygroscopic material, e.g., a synthetic resin, and the remaining interstices are filled with a non-hygroscopic compound, for example a polyisobutylene compound 38. The cable is sheated overall with a thick plastic sheath 40, e.g., of polyethylene.

As shown at 41, one tapping lead of a pair, lying adjacent to the element 31 and its return lead 32, is welded to the element 31. The ends of all of the tapping leads are similarly welded to the element at the appropriate intervals referred to above, the twinned leads being transposed as necessary to bring them adjacent to the element. The welds are insulated by a film of insulant compatible with the enamel and preferably adherent to it.

FIGURE 3 shows a cable made up, from the same wires as the cable of FIGURE 2 (marked with the same references), in the form of a flat ribbon. In this cable, however, the tapping leads are connected to the element 31 by cross-connectors 42 of the same enamelled wire as the tapping leads. In this cable the "return lead" 32 may provide half of the elemental lengths (staggered from the elemental lengths provided by the wire 31), similar cross-connectors 43 being used. The cross-connectors are separated from the leads that they cross by an insulating layer 44 of a plastics material (e.g., of polyethylene or polyethylene terephthalate or a composite layer of these materials) and an overall sheath 45 is applied. The leads may be transposed as necessary to shorten the cross-connectors and the pairs of tapping leads and the element and its return may be twinned.

FIGURE 6 shows the method of attaching the cross-connectors to the element. A similar technique can be used in the cable of FIGURE 2.

FIGURE 4 shows the auxiliary sensing cable 46 of FIGURE 2 incorporated in a power cable. The cable 46 is embedded in P.V.C. serving 47 applied to the metal sheath 48 of the power cable.

FIGURE 5 shows the auxiliary sensing cable 49 of FIGURE 3 attached by strapping 50 to the serving 51 of a power cable 52.

What we claim as our invention is:

1. A method of surveying the longitudinal temperature distribution in an electric cable in which an elongated resistance element having a temperature coefficient other than zero is so associated with the cable that its resistance is responsive to the temperature to be surveyed, comprising the steps of establishing a reference current in the resistance element, and applying the potential difference between the ends of each of a plurality of different elemental lengths of the resistance element, through tapping leads connected to the ends of the respective elemental lengths, to apparatus responsive to the potential difference.

2. A method of surveying the longitudinal temperature distribution in an electric cable in which an elongated resistance element having a temperature coefficient other than zero is so associated with the cable that its resistance is responsive to the temperatures to be surveyed, comprising the steps of establishing a first reference current preset by calibration to take into account the physical properties of a first elemental length in the resistance element, applying the potential difference across said first elemental length through tapping leads connected to the ends of the first elemental length to apparatus responsive to the potential difference, establishing a second reference current preset by calibration to take into account the physical properties of a second elemental length in the resistance element, and applying the potential differences across said second elemental length through tapping leads connected to the ends of the second elemental length to the said apparatus, and repeating the process for a plurality of elemental lengths of the resistance element.

3. In an electric cable installation, means for surveying the longitudinal temperature distribution of the cable comprising an elongated resistance element having a temperature coefficient of resistance other than zero so associated with the cable that its resistance is responsive to the temperature to be surveyed, means for establishing a reference current in the resistance element, tapping leads connected to the ends of a number of elemental lengths of the resistance element and means connected to the tapping leads responsive to the potential difference between the ends of each of the elemental lengths.

4. An installation as claimed in claim 3 comprising a reference current source having a plurality of preset current output levels, as many as there are elemental lengths, for establishing the reference current in the resistance element, first switching means for successively varying the output level of the current source, second switching means for successively connecting the elemental lengths to the means responsive to the potential difference, and means for so coupling the two said switching means that the preset current output levels are paired off with the elemental lengths and a different preset reference current level is provided during the time when the potential responsive means is connected across each elemental length.

5. An installation as claimed in claim 4 comprising a series of potentiometer type rheostats, equal to the number of elemental lengths, with their fixed elements connected in parallel in the circuit through which the resistance element is connected to the reference current source, a multiposition switch for successively connecting the pairs of tapping leads from each elemental length to the potential responsive means, and a second multiposition switch, mechanically coupled to the first multiposition switch, for successively connecting at the same intervals the sliders of the rheostats to a control terminal of the reference current source whereby the potential drop between the selected slider and the output terminal of the reference current source to which the rheostats are jointly connected is applied to a feed back circuit which regulates the current output level of the reference current source and provides a constant current in the resistance element, of the value dependent upon which rheostat is in the feed back circuit.

6. An installation as claimed in claim 3 in which the potential responsive means comprises means for establishing a preset reference potential, an alarm, and means for actuating the alarm when the output potential from an elemental length exceeds said reference potential by a small predetermined value.

7. An installation as claimed in claim 3 in which the potential responsive means comprises means for establishing a preset reference potential, a follow-up circuit that automatically adjusts said reference potential to balance a potential drop across an elemental length, means associated with the follow up circuit providing a signal representing the temperature of the elemental length, and means for feeding this signal to an indicating device.

References Cited

UNITED STATES PATENTS

| | | | |
|---|---|---|---|
| 1,917,129 | 7/1933 | Kirch | 174—11 |
| 1,946,155 | 2/1934 | Foster | 73—362 X |
| 2,619,573 | 11/1952 | Dawson | 73—362 X |
| 2,727,968 | 12/1955 | Rittner et al. | 338—25 |
| 2,792,481 | 5/1957 | Wood | 338—26 |

FOREIGN PATENTS 671,090   4/1952   Great Britain.

LOUIS R. PRINCE, *Primary Examiner.*

F. SHOON, *Assistant Examiner.*